(12) United States Patent
Yasuda et al.

(10) Patent No.: US 12,028,613 B2
(45) Date of Patent: Jul. 2, 2024

(54) IMAGE PROCESSING APPARATUS, IMAGE CAPTURING APPARATUS, IMAGE SHOOTING CONTROL APPARATUS, CONTROL METHOD THEREOF, AND STORAGE MEDIUM

(71) Applicant: CANON KABUSHIKI KAISHA, Tokyo (JP)

(72) Inventors: Ryuichiro Yasuda, Tokyo (JP); Yu Narita, Kanagawa (JP); Koichi Washisu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 235 days.

(21) Appl. No.: 17/479,529

(22) Filed: Sep. 20, 2021

(65) Prior Publication Data

US 2022/0094851 A1 Mar. 24, 2022

(30) Foreign Application Priority Data

Sep. 23, 2020 (JP) ................................ 2020-158971

(51) Int. Cl.
*H04N 23/68* (2023.01)
*G06T 5/73* (2024.01)

(52) U.S. Cl.
CPC ............. *H04N 23/683* (2023.01); *G06T 5/73* (2024.01); *H04N 23/6811* (2023.01)

(58) Field of Classification Search
CPC ............. H04N 23/683; H04N 23/6811; H04N 23/698; H04N 23/73; H04N 23/61; G06T 5/003; G06T 7/33; G06T 5/50; G06T 2207/10016; G06T 2207/20201
See application file for complete search history.

(56) References Cited

U.S. PATENT DOCUMENTS

| | | | |
|---|---|---|---|
| 10,986,272 B2 * | 4/2021 | Tabei ..................... | G03B 17/18 |
| 2012/0169892 A1 * | 7/2012 | Numata .................. | G06T 5/003 |
| | | | 348/208.4 |
| 2013/0265464 A1 * | 10/2013 | Nishio ................. | H04N 23/672 |
| | | | 348/239 |
| 2015/0262341 A1 * | 9/2015 | Nash ...................... | H04N 23/80 |
| | | | 348/208.6 |
| 2019/0281216 A1 * | 9/2019 | Masamura ............... | G06T 7/73 |

FOREIGN PATENT DOCUMENTS

| | | |
|---|---|---|
| JP | 4418632 B2 | 2/2010 |
| JP | 5976315 B2 | 8/2016 |

\* cited by examiner

*Primary Examiner* — Kelly L Jerabek
(74) *Attorney, Agent, or Firm* — Cowan, Liebowitz & Latman, P.C.

(57) ABSTRACT

An image processing apparatus comprises a first alignment unit that aligns a plurality of images that have been continuously shot, a second alignment unit that aligns the plurality of images with higher accuracy than the first alignment unit, a processing time taken to perform the alignment being longer than a processing time taken by the first alignment unit, a selection unit that selects an alignment unit from the first alignment unit and the second alignment unit to be used for aligning the plurality of images according to shooting conditions of the plurality of images, and a synthesis unit that synthesizes the plurality of images that have undergone alignment by the alignment unit selected by the selection unit.

25 Claims, 9 Drawing Sheets

| DETERMI-NATION ITEMS | | FIRST ALIGNMENT UNIT | SECOND ALIGNMENT UNIT |
|---|---|---|---|
| | EXPOSURE PERIOD OF EACH IMAGE | PREDETERMINED PERIOD OR SHORTER | LONGER THAN PREDETERMINED PERIOD |
| | NUMBER OF SHOTS | PREDETERMINED NUMBER OR MORE | LESS THAN PREDETERMINED NUMBER |
| | AMOUNT OF ROTATIONAL CAMERA SHAKE OVER PERIOD OF CONTINUOUS SHOOTING | PREDETERMINED AMOUNT OR LESS | LARGER THAN PREDETERMINED AMOUNT |
| | SIZE OF SUBJECT AND AMOUNT OF ROTATIONAL CAMERA SHAKE OVER PERIOD OF CONTINUOUS SHOOTING | EITHER PREDETERMINED VALUE OR LESS, OR PREDETERMINED AMOUNT OR LESS | LARGER THAN PREDETERMINED VALUE AND PREDETERMINED AMOUNT |

IMAGE PROCESSING APPARATUS, IMAGE CAPTURING APPARATUS, IMAGE SHOOTING CONTROL APPARATUS, CONTROL METHOD THEREOF, AND STORAGE MEDIUM

BACKGROUND OF THE INVENTION

Field of the Invention

The present invention relates to an image blur correction technique in an image capturing apparatus such as a digital camera and a digital video camera.

Description of the Related Art

Japanese Patent No. 4418632 discloses a technique for aligning and synthesizing a plurality of images taken with a short exposure period to obtain an image equivalent to an image taken with a long exposure period and free from image blur caused by camera shake (hereinafter referred to as image blur correction by image synthesis).

Further, a technique for aligning a plurality of images is disclosed in Japanese Patent No. 5976315. In this technique, a RAW image obtained from an image sensor with a Bayer filter array is translated to correct the angular blur about a Pitch axis and a Yaw axis and the translational blur in the X and Y directions, and then the corrected RAW image is converted into a YUV image. After the conversion, the YUV image undergoes the rotation blur correction about a Roll axis.

However, in a case where the image blur correction by image synthesis is performed using a large number of images by using the technique disclosed in Japanese Patent No. 4418632, if the images are aligned by using the technique disclosed in Japanese Patent No. 05976315, there is a problem that it may take a long processing time.

SUMMARY OF THE INVENTION

The present invention has been made in consideration of the above situation, and shortens a time for image alignment processing while keeping good alignment accuracy upon performing the image blur correction by image synthesis.

According to a first aspect of the present invention, there is provided an image processing apparatus comprising at least one processor or circuit configured to function as: a first alignment unit that aligns a plurality of images that have been continuously shot; a second alignment unit that aligns the plurality of images with higher accuracy than the first alignment unit, a processing time taken to perform the alignment being longer than a processing time taken by the first alignment unit; a selection unit that selects an alignment unit from the first alignment unit and the second alignment unit to be used for aligning the plurality of images according to shooting conditions of the plurality of images; and a synthesis unit that synthesizes the plurality of images that have undergone alignment by the alignment unit selected by the selection unit.

According to a second aspect of the present invention, there is provided an image capturing apparatus comprising: an image shooting device capable of continuously shooting a plurality of images; and an image processing apparatus comprising at least one processor or circuit configured to function as: a first alignment unit that aligns a plurality of images that have been continuously shot; a second alignment unit that aligns the plurality of images with higher accuracy than the first alignment unit, a processing time taken to perform the alignment being longer than a processing time taken by the first alignment unit; a selection unit that selects an alignment unit from the first alignment unit and the second alignment unit to be used for aligning the plurality of images according to shooting conditions of the plurality of images; and a synthesis unit that synthesizes the plurality of images that have undergone alignment by the alignment unit selected by the selection unit.

According to a third aspect of the present invention, there is provided an image shooting control apparatus comprising at least one processor or circuit configured to function as: a control unit that controls a correction device for correcting image blur based on output from a shake detection sensor; an alignment unit that aligns a plurality of images shot by an image shooting device; and a synthesis unit that synthesizes the plurality of images aligned by using the alignment unit, wherein the control unit controls to perform image blur correction without driving the correction device in a first period and with driving the correction device in a second period, and wherein the synthesis unit synthesizes a plurality of images shot in the first period and an image shot in the second period.

According to a fourth aspect of the present invention, there is provided a control method of an image processing apparatus comprising at least one processor or circuit configured to function as a first alignment unit that aligns a plurality of images that have been continuously shot and a second alignment unit that aligns the plurality of images with higher accuracy than the first alignment unit, a processing time taken to perform the alignment being longer than a processing time taken by the first alignment unit, the method comprising: selecting an alignment unit from the first alignment unit and the second alignment unit to be used for aligning the plurality of images according to shooting conditions of the plurality of images; and synthesizing the plurality of images that have undergone alignment by the alignment unit selected by the selection unit.

According to a fifth aspect of the present invention, there is provided a control method of an image shooting control apparatus comprising: controlling a correction device for correcting image blur based on output from a shake detection sensor; aligning a plurality of images shot by an image shooting device; and synthesizing the plurality of aligned images, wherein image blur correction is controlled to be performed without driving the correction device in a first period and with driving the correction device in a second period, and wherein a plurality of images shot in the first period and an image shot in the second period are synthesized upon synthesizing the plurality of aligned images.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

<Explanation of Overall Configuration>

Figure 1:
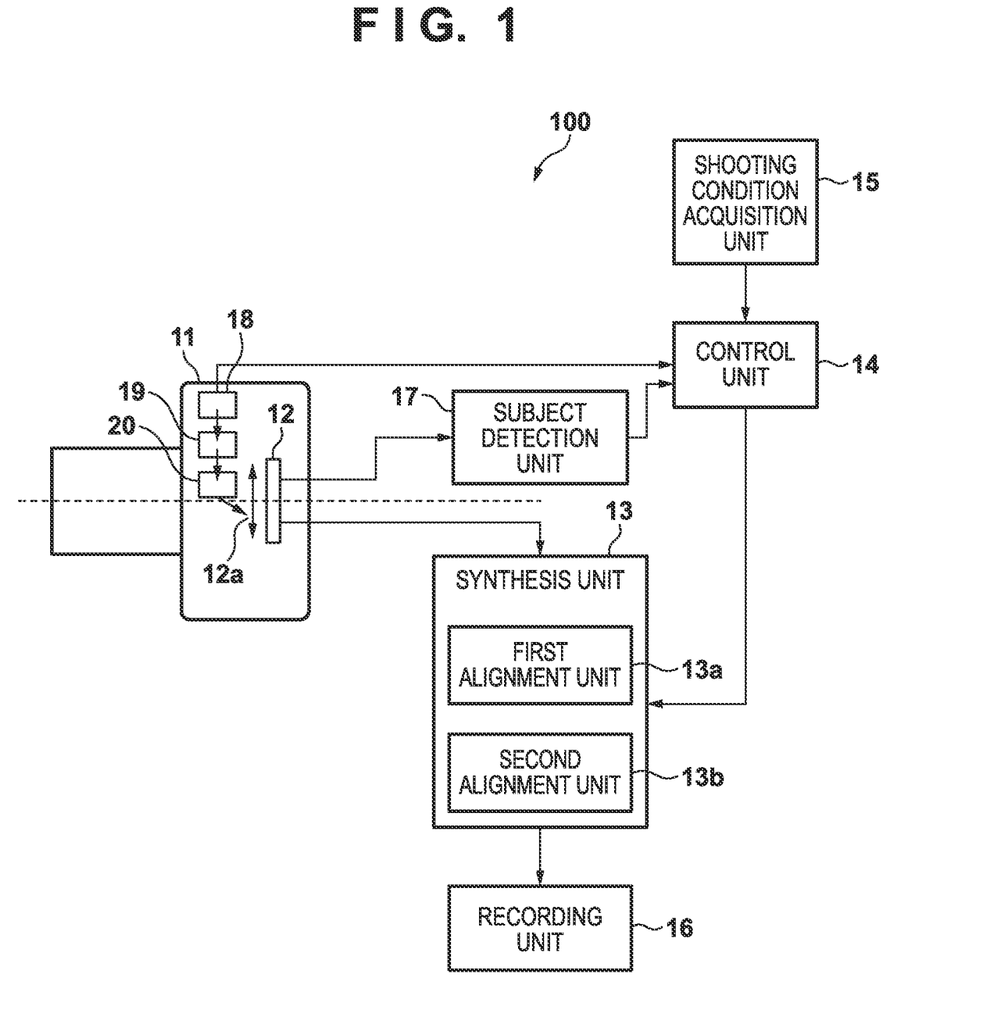
FIG. 1 is a block diagram showing a configuration of an image capturing apparatus equipped with an image blur correction apparatus according to a first embodiment of the present invention.

FIG. 1 is a block diagram showing a configuration of an image capturing apparatus 11 equipped with an image blur correction apparatus according to a first embodiment of the present invention. In the following description, the shake of the image capturing apparatus 11 itself is referred to as "shake", and the shake of the subject image on the imaging surface caused by the shake of the image capturing apparatus 11 is referred to as "blur".

The image capturing apparatus 11 includes an image sensor 12 that captures an image of a subject (referred to as a subject image, hereinafter.) The image sensor 12 has a color filter of a Bayer arrangement, and the image signal acquired from the image sensor 12 is a RAW image signal having color information on one color for each pixel. The each pixel of the RAW image signal corresponds to each pixel of the image sensor 12. A synthesis unit 13 aligns and synthesizes images sequentially output from the image sensor 12.

Alignment of images in the synthesis unit 13 is performed by using a first alignment unit 13a and a second alignment unit 13b. The first alignment unit 13a aligns RAW images by translating the images with an accuracy of a two-pixel period using a motion vector between the images (first alignment). The second alignment unit 13b converts RAW images into YUV images having color information on a plurality of colors for each pixel, and the YUV images are aligned by performing geometric transformation including a translation component and a rotation component with an accuracy of sub-pixel using a motion vector between the images (second alignment). In the processing in the second alignment unit 13b, a conversion process to a YUV image and a geometric transformation process are added as compared with the processing in the first alignment unit 13a. Therefore, the processing speed of the first alignment unit 13a is faster than the processing speed of the second alignment unit 13b, and the processing time of the first alignment unit 13a is shorter than the processing time of the second alignment unit 13b. On the other hand, the alignment processing in the second alignment unit 13b takes time, but its accuracy is higher than the accuracy of the alignment processing in the first alignment unit 13a. Then, the synthesis unit 13 synthesizes the images aligned by either the first alignment unit 13a or the second alignment unit 13b.

A control unit (shooting control unit, correction control unit) 14 selects either the first alignment unit 13a or the second alignment unit 13b of the synthesis unit 13 based on the shooting conditions of the image capturing apparatus 11 acquired from a shooting condition acquisition unit 15 and the detection results of a subject detection unit 17 and a shake detection unit 18 described later. Then, the control unit 14 makes the selected alignment unit align the images, and the synthesis unit 13 synthesize the aligned images. The image synthesized by the synthesis unit 13 is recorded in a recording unit 16. The control unit 14 also has a function of controlling the entire image capturing apparatus 11.

The subject detection unit 17 detects the size of a subject and the magnitude of the rotational blur of the subject. A known technique of the subject recognition method may be used, and the size of the subject may be detected based on the recognition result. Further, the magnitude of the rotational blur of the subject is calculated from the motion vector of the subject. The detection result by the subject detection unit 17 is output to the control unit 14.

The shake detection unit 18 detects shake applied to the image capturing apparatus 11. The output of the shake detection unit 18 is output to the control unit 14. Further, the output of the shake detection unit 18 is converted into a signal suitable for image blur correction by a calculation unit 19. A signal of a blur correction target value output from the calculation unit 19 is input to a driving unit 20, and the image sensor 12 is moved by the driving unit 20 in the direction of an arrow 12a or the like. By moving the image sensor 12 in response to the detected shake, the image blur on an imaging surface of the image sensor 12 is canceled. Thus, the image sensor 12 serves as both an image capturing means for capturing an image of a subject and an image blur correction means. The method of optically correcting the image blur in this way is defined as optical image blur correction, and the image blur correction using the image synthesis unit 13 is defined as image-processing image blur correction.

In the optical image blur correction, if the shake detection accuracy of the shake detection unit 18 and the movement accuracy of the image sensor 12 are not high, sufficient image blur correction cannot be performed. Therefore, the accuracy of image blur correction can be improved by applying the image-processing image blur correction by image processing to the residual image blur on the imaging surface after the optical image blur correction is performed.

<Explanation of Flowchart>

Figure 2:
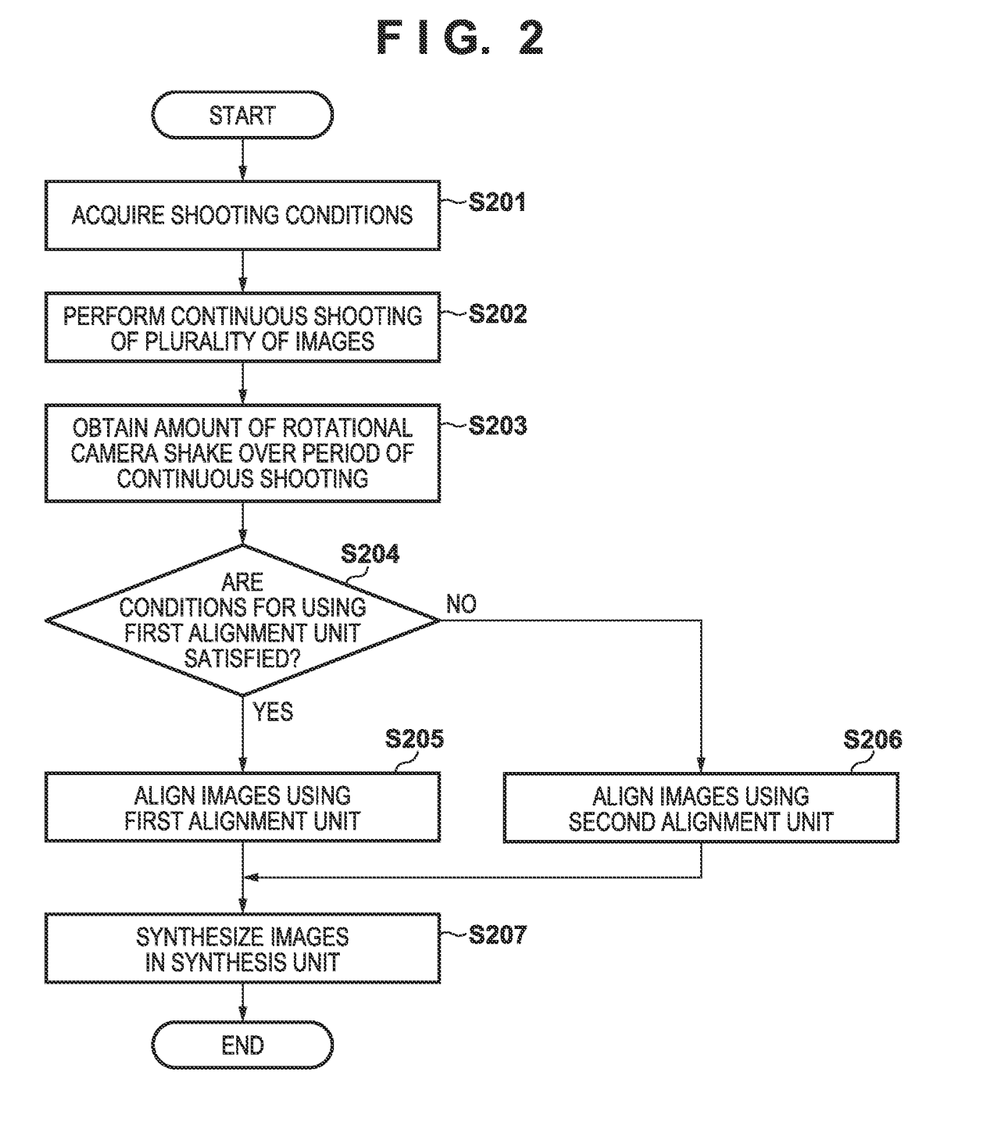
FIG. 2 is a flowchart showing image blur correction processing according to the first embodiment.

FIG. 2 is a flowchart illustrating the operation of the synthesis unit 13 and the control unit 14. The processing of this flowchart is started in response to a shooting start instruction such as an operation of a release button of the image capturing apparatus 11.

In step S201, the control unit 14 receives the shooting conditions from the shooting condition acquisition unit 15. The shooting conditions include the number of shots, the exposure period of each image, the amount of rotational camera shake, and the like. The number of shots and the exposure period of each image may be set directly by the user, or may be calculated and set in the image capturing apparatus. When calculating and setting them in the image capturing apparatus, each item is determined based on the total exposure period set by the user, the amount of camera shake, and the performance of the optical image blur correction. The smaller the amount of camera shake is and the higher the performance of the optical image blur correction is, the longer the exposure period of each image is set. The number of shots is calculated by dividing the total exposure period set by the user by the exposure period of each image. The amount of rotational camera shake is detected by the shake detection unit 18.

In step S202, the control unit 14 controls to continuously shoot a plurality of images based on the number of shots and the exposure period set in step S201 (a plurality of images are shot continuously).

In step S203, the control unit 14 acquires the amount of rotational camera shake over the period of the continuous shooting of the plurality of images from the shake detection unit 18.

In step S204, the control unit 14 determines whether or not the shooting conditions acquired from the shooting condition acquisition unit 15 and information on a subject detected by the subject detection unit 17 satisfy the conditions for using the first alignment unit 13a. If it is determined that the conditions are satisfied, the process proceeds to step S205, and if it is determined that the conditions are not satisfied, the process proceeds to step S206.

Figure 3:
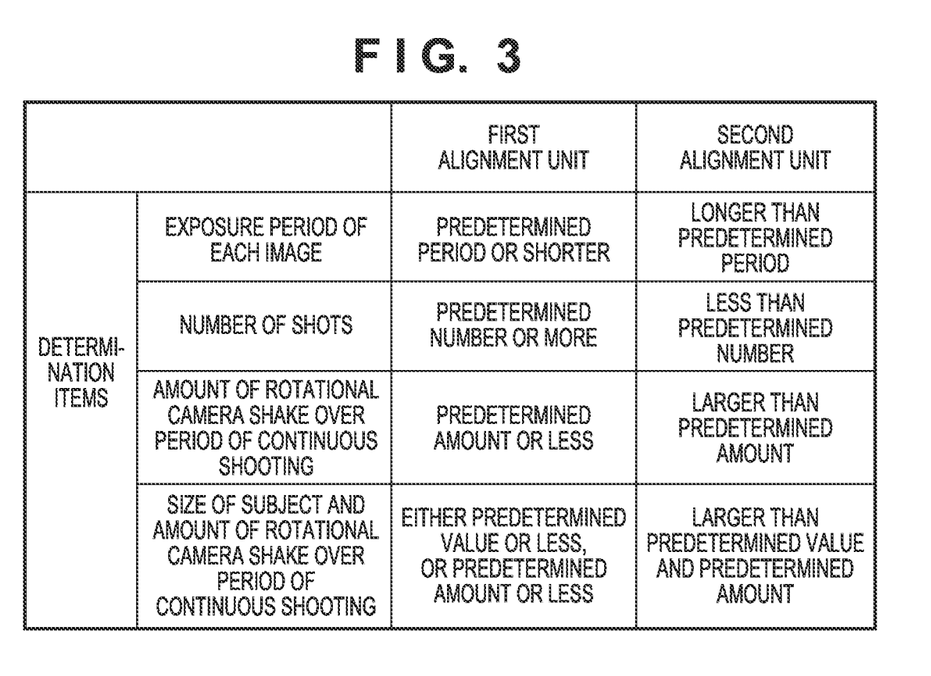
FIG. 3 is a diagram showing determination items for selecting a first alignment unit or a second alignment unit.

Here, the determination in step S204 will be described. FIG. 3 is a diagram showing determination items (determination items for changes in image shooting conditions) for determining whether to use the first alignment unit 13a or the second alignment unit 13b upon performing alignment for image synthesis in the synthesis unit 13.

(Determination Condition: Exposure Period of Each Image)

If the exposure period of each image is a predetermined period or shorter, the first alignment unit 13a is used in order to shorten the processing time. On the other hand, when the exposure period of each image is longer than the predetermined period, the amount of image blur appearing in each image becomes large. If the motion vector is detected from the RAW images with a large amount of blur, an error is likely to occur. In this case, the motion vector can be detected accurately by converting the RAW images into YUV images using the second alignment unit 13b. Therefore, only when the exposure period is the predetermined period or shorter, the first alignment unit 13a is used, thereby shortening the processing time while maintaining the alignment accuracy. The predetermined period is determined based on an allowable blur amount per image and the performance of the optical image blur correction. The larger the allowable blur amount is and the higher the performance of the optical image blur correction is, the longer the predetermined time is set.

(Determination Condition: Number of Shots)

If the number of shots is a predetermined number or more, the first alignment unit 13a is used in order to shorten the processing time. The second alignment unit 13b takes a long processing time since it performs conversion of RAW images into YUV images for the number of shots, but the first alignment unit 13a takes a short processing time since it aligns the RAW images as they are and performs conversion to the YUV image only once at last. Therefore, in a case where the number of shots is large, the processing time can be significantly shortened by using the first alignment unit 13a. If the number of shots is less than the predetermined number, the difference in processing time between the first and second alignment units 13a and 13b is small, so the second alignment unit 13b with high alignment accuracy is used. Further, the predetermined number of shots is determined based on an allowable time for the alignment process and the processing time for converting a RAW image into a YUV image. The longer the allowable time is and the shorter the processing time for converting a RAW image into a YUV image is, the larger the predetermined number of shots is set.

(Determination Condition: Amount of Rotational Camera Shake Over Period of Continuous Shooting)

If the amount of rotational camera shake over the period of the continuous shooting is a predetermined amount or less, the first alignment unit 13a is used in order to shorten the processing time. If the amount of rotational camera shake is the predetermined amount or less, the time reduction by the first alignment unit 13a is prioritized over the alignment accuracy by the second alignment unit 13b that performs geometric transformation including the rotational component. On the other hand, if the amount of rotational camera shake over the period of the continuous shooting is larger than the predetermined amount, rotational blur will be noticeable if the alignment is performed only by translation, so the second alignment unit 13b is used with priority given to the alignment accuracy. The larger the permissible amount of rotational blur is, the larger the predetermined amount becomes.

The amount of rotational camera shake over the period of the continuous shooting may be the amount of camera shake actually detected during the continuous shooting, or may be estimated from the amount of rotational camera shake during aiming immediately before the continuous shooting. By performing the alignment control based on the estimated result obtained before the continuous shooting, the alignment can be started at any time immediately after the exposure of each image is started, and the processing time can be shortened.

(Determination Condition: Size of Subject and Amount of Rotational Camera Shake Over Period of Continuous Shooting)

If the size of the subject is equal to or less than a predetermined value or if the amount of rotational camera shake over the period of the continuous shooting is equal to or less than a predetermined amount, the first alignment unit 13a is used to shorten the processing time. On the other hand, if the size of the subject is larger than the predetermined value and the amount of rotational camera shake over the period of the continuous shooting is larger than the predetermined amount, since the rotational blur of the subject will be conspicuous, so the second alignment unit 13b is used with priority given to the alignment accuracy.

As an example, the predetermined value for the size of the subject is considered to be half the size of the screen. This is because if the subject is large, the blur of the subject becomes dominant when calculating the movement amount for alignment from the motion vector of the entire image. Further, the predetermined amount for rotational camera shake is determined by allowable rotational blur of the subject in a synthesized image. The larger the allowable amount of rotational blur of the subject is, the larger the predetermined amount becomes.

The amount of rotational camera shake over the period of the continuous shooting may be the amount of camera shake detected during the actual continuous shooting, or may be estimated from the amount of rotational camera shake during aiming immediately before the continuous shooting. By performing the alignment control based on the estimated result obtained before the continuous shooting, the alignment can be started at any time immediately after the exposure of each image is started, and the processing time can be shortened.

It is not always necessary to use all of the four determination items, i.e., the exposure period of each image, the number of shots, the amount of rotational camera shake over the period of the continuous shooting, and the size of the subject and the amount of rotational camera shake over the period of the continuous shooting, and at least one of these determination items should be used. When a plurality of determination items are used, the final determination may be performed by taking a logical product or a logical sum, or by prioritizing the determination items to make a final determination.

In step S205, the first alignment unit 13a aligns the images. In step S206, the second alignment unit 13b aligns the images.

In step S207, the synthesis unit 13 synthesizes the images aligned by the first alignment unit 13a or the second alignment unit 13b.

In this way, by switching between the first alignment unit characterized by high processing speed and the second alignment unit characterized by high alignment accuracy according to the shooting conditions, it is possible to realize a good balance between the processing time and alignment accuracy.

Second Embodiment

Since the configuration of an image capturing apparatus in this embodiment is the same as the configuration shown in FIG. 1 in the first embodiment, the description thereof will be omitted. However, since the control unit 14 of the present embodiment selects either the first alignment unit 13a or the second alignment unit 13b in the synthesis unit 13 or uses both of them in combination according to the shooting conditions of the image capturing apparatus obtained from the shooting condition output unit 15, the subject detection unit 17 is not necessary.

Figure 4:
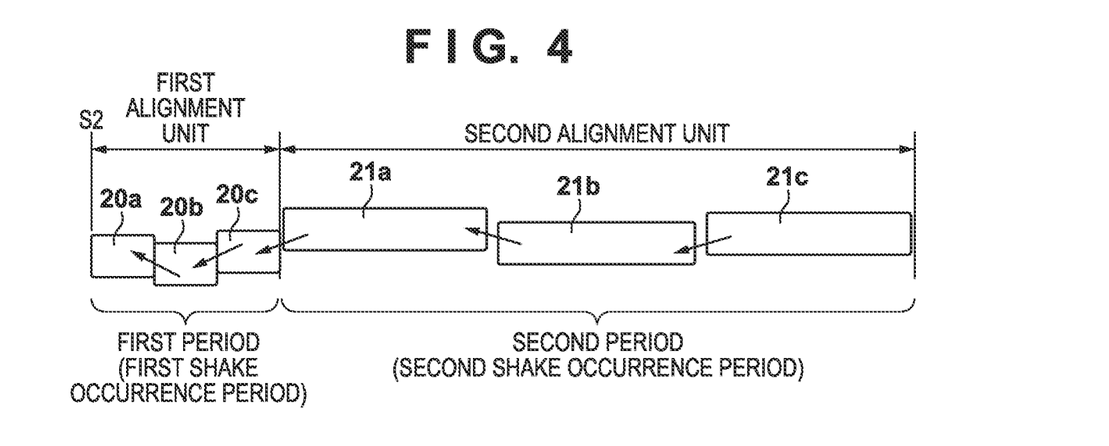
FIG. 4 is a diagram for explaining an operation of a synthesis unit according to a second embodiment.

FIG. 4 is a diagram illustrating the operation of the synthesis unit 13 in the second embodiment. In FIG. 4, the deviation in composition between the images is expressed by shifting the positions of the images 20a to 20c and 21a to 21c output from the image sensor 12 in the vertical direction.

In FIG. 4, according to the instruction from the control unit 14, the synthesis unit 13 uses the first alignment unit 13a for the images 20a to 20c, acquired before the predetermined period elapses from the start of shooting, to align the images in order to cancel the composition deviation between the images. Then, for the image 21a and the subsequent images acquired after the predetermined period has elapsed, the second alignment unit 13b is used to align the images in order to cancel the composition deviation between the images. The reason for this will be described below.

Before the image capturing apparatus 11 starts shooting, reaction force and impact are generated by driving the components of the image capturing apparatus 11 for a focusing operation of the optical system and travelling and stopping operations of the shutter curtain, and so forth. The reaction force, impact, and camera shake by the photographer cause the image capturing apparatus 11 to generate a first shake. The shake caused by the movement of the mechanical parts of the image capturing apparatus 11 in addition to the camera shake is called the first shake, and the shake caused only by the camera shake is called a second shake.

In the shake detection unit 18, the detection accuracy of the first shake is generally lower than the detection accuracy of the second shake. The shake of the image capturing apparatus 11 due to the above-mentioned reaction force and impact is, for example, a shake of a high frequency of about 30 Hz, which is higher than a frequency of the camera shake caused by the photographer generally distributed from 1 Hz to 10 Hz. That is, in a first shake occurrence period, which is a first period, in which the shake of the camera due to the reaction force and impact occurs, it is necessary to correct the shake of 30 Hz, which is the remnant of the image blur correction, by aligning the images. Therefore, the images 20a to 20c are acquired at a period sufficiently shorter than the period of 1/30 second, for example, with an exposure period of 1/90 second, and aligned and synthesized.

Since the exposure period of each image is short, the alignment needs to be performed at high speed, and thus the alignment between the images is performed using the first alignment unit 13a. The first alignment unit 13a aligns the images with first accuracy, and since the alignment with the first accuracy uses only motion vectors, the time required for the alignment is short. Therefore, the images, each captured with the short exposure period of 1/90 second, can be aligned without delay. The synthesis unit 13 sequentially synthesizes the images aligned by the first alignment unit 13a.

Since the first shake occurrence period is short, image deterioration is unlikely to occur even if the alignment is performed with the first accuracy. When the first shake generated within the image capturing apparatus 11 is settled, the period shifts from the first period to a second shake occurrence period, which is a second period. Since the second period does not include high-frequency shake, the images 21a to 21c are each acquired with an exposure period of, for example, 1/30 second, and aligned and synthesized.

Since each exposure period is long, there is a sufficient time for alignment. Therefore, the second alignment unit 13b is used to align the images. The second alignment unit 13b performs the alignment with the second accuracy, and the second accuracy is high because the alignment is performed using the motion vector and the geometric transformation. The synthesis unit 13 sequentially synthesizes the images aligned by the first alignment unit 13a and then the images aligned by the second alignment unit 13b.

Although the second shake occurrence period is longer than the first shake occurrence period, image deterioration is unlikely to occur because the alignment is performed by the second alignment unit 13b with high accuracy.

In this way, the first alignment unit 13a is used in the first shake occurrence period and the second alignment unit 13b is used in the second shake occurrence period to align the images. Here, since the first shake occurs immediately after the start of shooting, the configuration may be such that the first alignment unit 13a is used for a predetermined period from the start of shooting, and after the predetermined period has elapsed, the second alignment unit 13b is used to align the images.

Figure 5:
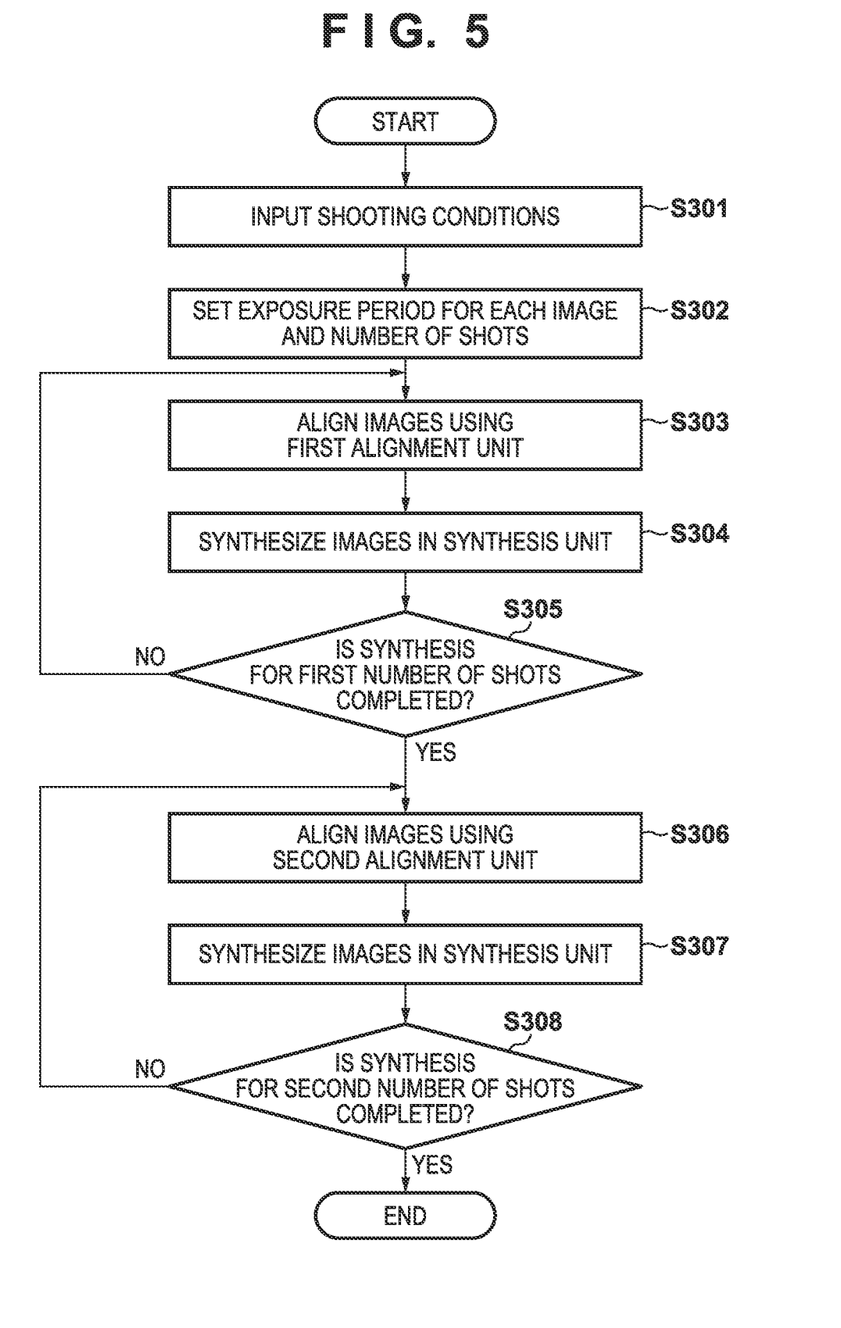
FIG. 5 is a flowchart showing image blur correction processing according to the second embodiment.

FIG. 5 is a flowchart illustrating the operation of the synthesis unit 13 and the control unit 14. The processing of this flowchart is started in response to a shooting start instruction such as an operation of a release button of the image capturing apparatus 11.

In step S301, the control unit 14 receives the shooting conditions from the shooting condition output unit 15.

Shooting conditions include shooting time, speed of shutter curtain focus adjustment, and amount of camera shake.

In step S302, the control unit 14 sets the exposure period for each image and the number of shots based on the obtained shooting conditions. The setting of the exposure period for each image and the number of shots based on the shooting conditions (driving state of each element) will be described below.

(1) Speed of Shutter Curtain

If the speed of shutter curtain is high, the reaction force caused by the running of the shutter curtain and the impact when the shutter curtain is stopped will be large, so the magnitude of the first shake may be large as well as the continuing time of the first shake may be long. Therefore, a short exposure period for each image (20a to 20c in FIG. 4) during the first shake occurrence period is set. Further, the continuing time of the first shake is predicted.

(2) Focus Adjustment

When the lens for focusing moves at high speed for a long distance, the reaction force against the driving of the lens and the impact when the lens is stopped become large, so the magnitude of the first shake may be large as well as the continuing time of the first shake may be long. Therefore, a short exposure period for each image (20a to 20c in FIG. 4) during the first shake occurrence period is set. Further, the continuing time of the first shake is predicted.

Based on the relationship between a first exposure period, which is the shorter exposure period of the exposure periods for respective images set under the above conditions of the speed of the shutter curtain and the focus adjustment, and a first shooting period which is the longer period of the shooting period in which the first shake continues, the first number of shots in the first shooting period is set. Specifically, if the first exposure period is 1/90 second and the first shooting period is 0.09 seconds, the first number of shots is set to about 10. In the present embodiment, the images acquired during the period from the start of shooting to the elapse of the first shooting period are aligned by the first alignment unit 13a and synthesized.

(3) Camera Shake

If the magnitude of the camera shake detected by the shake detection unit 18 before shooting is started is large, the second shake may be also large during the shooting. Accordingly, a short exposure period (second exposure period) for each image (21a to 21c in FIG. 4) during the second shake occurrence period is set.

(4) Shooting Time

A second shooting period, which is the second shake occurrence period, is obtained by subtracting the first shooting time obtained as described above from the shooting period obtained from the brightness of the subject or the shooting period set by the photographer. Then, based on the relationship between the second exposure period and the second shooting period, a second number of shots is set.

In step S303, the control unit 14 controls to perform shooting with the first exposure period set in step S302, and aligns an image with the previous image by using the first alignment unit 13a. The first alignment unit 13a quickly aligns the composition deviation between the images with the first alignment accuracy.

In step S304, the synthesis unit 13 synthesizes the aligned images.

In step S305, the control unit 14 controls to repeat steps S303 and S304 until the alignment and synthesis up to the first number of shots set in step S302 are completed. As a result, the images 20a to 20c in FIG. 4 are aligned and synthesized.

In step S306, the control unit 14 controls to perform shooting with the second exposure period set in step S302, and aligns an image with the previous image by using second first alignment unit 13b. The second alignment unit 13b accurately aligns the composition deviation between the images with the second alignment accuracy.

In step S307, the synthesis unit 13 synthesizes the aligned images. Note that the first image shot in the second shooting period is aligned with the synthesized image obtained in the first shooting period by using the second alignment unit 13b and synthesized.

In step S308, the control unit 14 controls to repeat steps S306 and S307 until the alignment and synthesis up to the second number of shots set in step S302 are completed. As a result, the images 21a to 21c in FIG. 4 are aligned and synthesized.

In this way, for the first shake that occurs at the start of shooting, each image is shot with the first exposure period, and the first alignment unit 13a is used to quickly align the images. This makes it possible to correct high-frequency image blur. Then, for the second shake that occurs after that, each image is shot with the second exposure period, and the blur is corrected with high accuracy by using the second alignment unit 13b.

Third Embodiment

Figure 6:
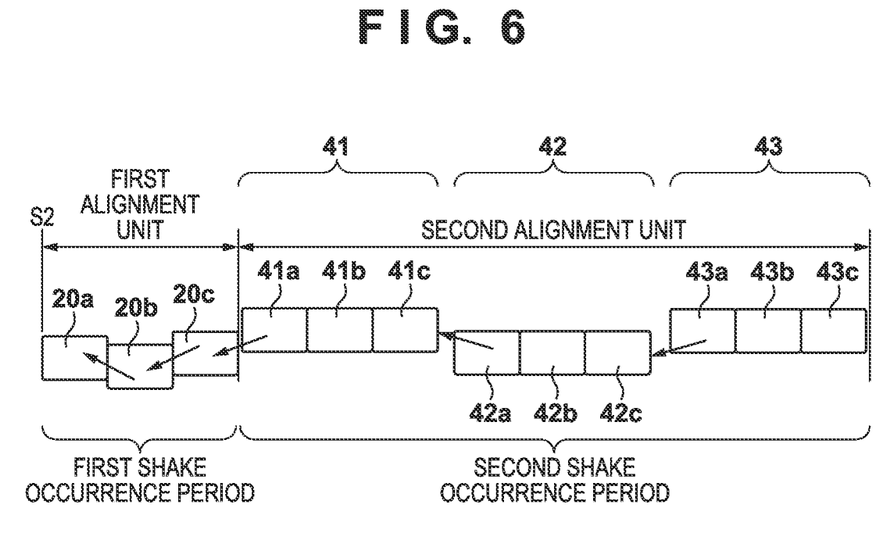
FIG. 6 is a diagram illustrating an operation of a synthesis unit according to a third embodiment.

FIG. 6 is a diagram illustrating the operation of the synthesis unit 13 in the third embodiment. The difference from FIG. 4 is that the exposure period for each image is set to be the same as that in the first shake occurrence period even in the second shake occurrence period. Since the control in the first shake occurrence period is the same as that of the second embodiment, only the control in the second shake occurrence period will be described below.

In the second embodiment, the exposure period for each image in the first shake occurrence period was 1/90 second, and the exposure period for each image in the second shake occurrence period was 1/30 second. On the other hand, in the third embodiment, the exposure period for each image is set to 1/90 second even in the second shake occurrence period. The reason for this is that the control load is reduced by using the same exposure period.

Then, in the present embodiment, as is shown in FIG. 6, images 41a to 41c in the second shake occurrence period are synthesized without performing the alignment, and an image 41 is generated. The total exposure period of the image 41 is 1/30 second, but in the second shake occurrence period, the image deterioration due to camera shake is small even during 1/30 second. Similarly, images 42a to 42c and images 43a to 43c are also synthesized without alignment to generate images 42 and 43. Then, images 41 to 43 are accurately aligned using the second alignment unit 13b, similarly to the operation shown in FIG. 4.

Figure 7:
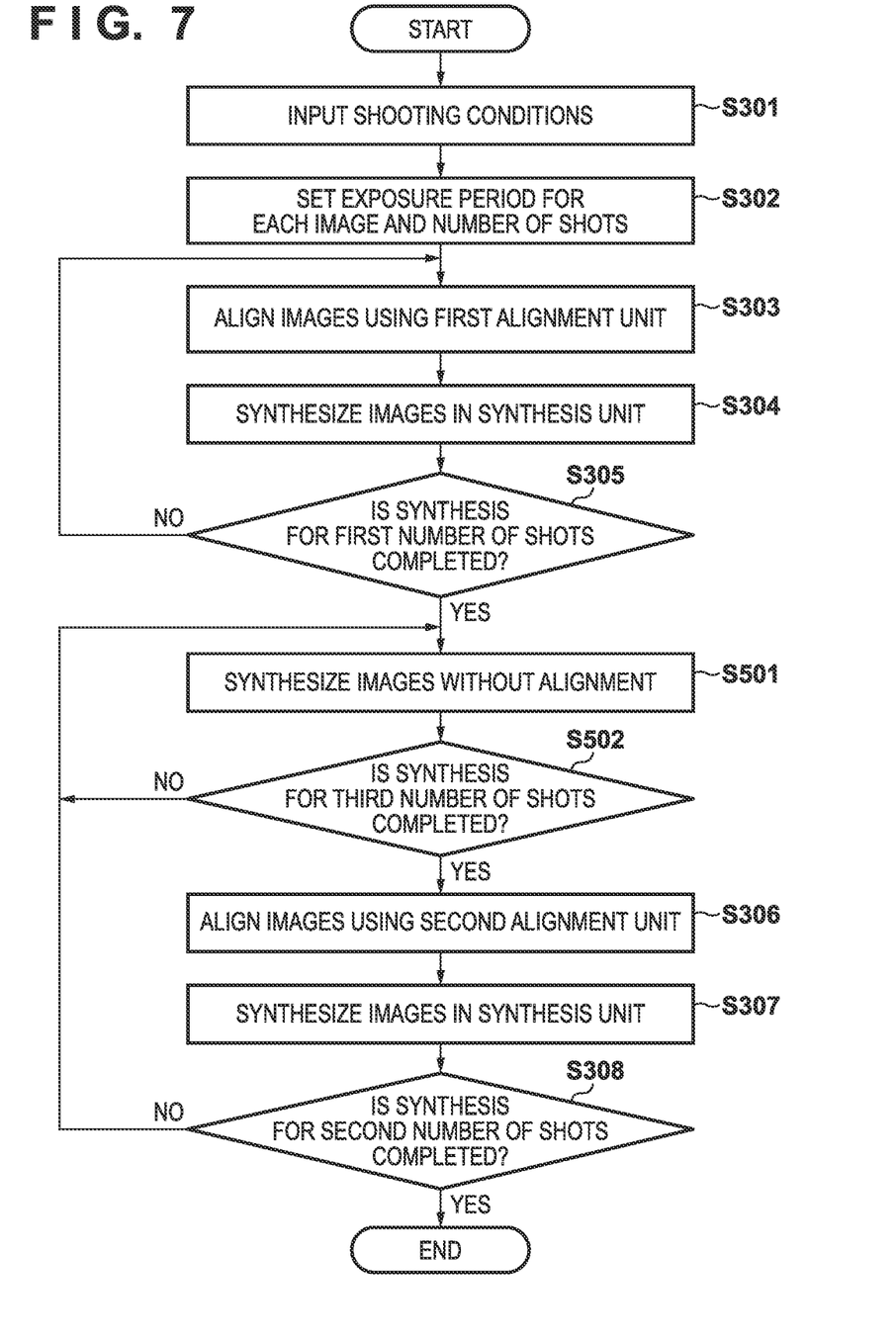
FIG. 7 is a flowchart showing image blur correction processing according to the third embodiment.

FIG. 7 is a flowchart for explaining the operation of the synthesis unit 13 and the control unit 14, and the difference from the flowchart of FIG. 5 is that steps S501 and S502 are added. Therefore, only these steps will be described. Further, it is assumed that the shooting conditions such as the first and second exposure periods are obtained in the same manner as in the second embodiment.

In step S501 the synthesis unit 13 synthesizes images shot with the exposure period of 1/90 second (for example, image 41a in the example of FIG. 6) during the second exposure period without alignment.

In step S502, the third number of shots (three images 41a to 41c in the case of FIG. 6) is obtained from the ratio of the first exposure period and the second exposure period, and steps S501 and S502 are performed until processes for the third number of shots is completed.

That is, by repeating steps S501 and S502, for example, the images 41a to 41c of FIG. 6 are combined to generate the image 41.

When the synthesis to generate the image 41 is completed, the process proceeds to step S306. In the second embodiment, the process returns from step S308 to step S306, but in the third embodiment, the process returns to step S501. By repeating the loop from steps S501 to S308, the images 41 to 43 of FIG. 6 are synthesized. The synthesized image of the images 41 to 43 in the second shake occurrence period are aligned with the synthesized image obtained in the first shake occurrence period by the second alignment unit 13b and synthesized.

As described above, in the third embodiment, since each image can be obtained with the same exposure period in the first shake occurrence period and in the second shake occurrence period, it is possible to simplify the control.

Fourth Embodiment

Figure 8:
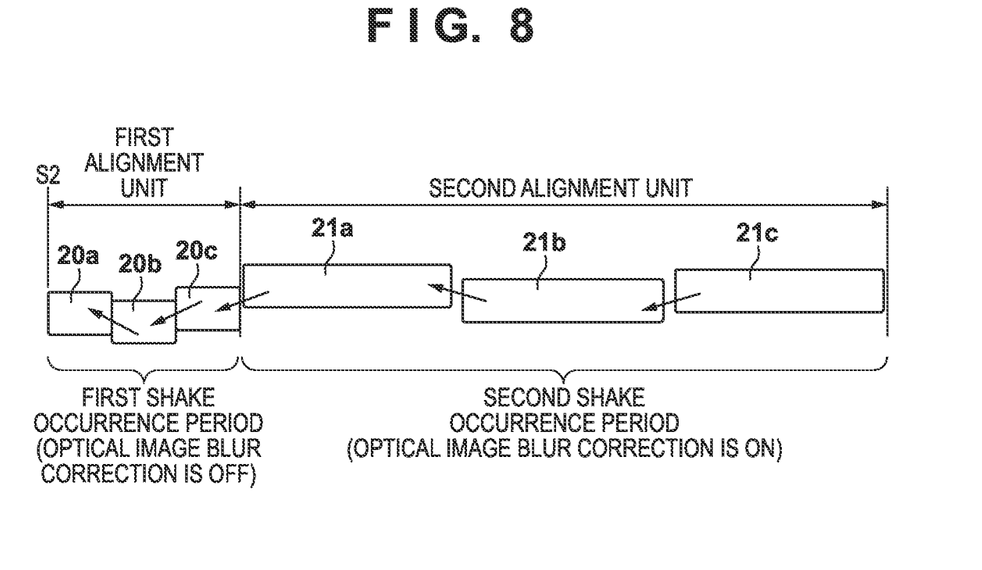
FIG. 8 is a diagram illustrating an operation of a synthesis unit according to a fourth embodiment.

FIG. 8 is a diagram illustrating the operation of the synthesis unit 13 in the fourth embodiment of the present invention, and is different from FIG. 4 in that the optical image blur correction is turned off during the first shake occurrence period.

The reason for turning off the optical image blur correction will be explained below.

The shake detection unit 18 generally uses a vibration gyro (angular velocity sensor), but as a drawback of the vibration gyro, there is a problem that the detection accuracy significantly drops when detecting a vibration of a specific frequency. Therefore, there are cases in which the sensitivity may be low with respect to the vibration generated by the travelling of the shutter curtain and the operation accompanying the focus adjustment, that is, mainly the high frequency vibration, and when such vibration occurs, the accuracy of the optical image blur correction deteriorates, which may cause deterioration of image quality. Therefore, during the first shake occurrence period when the shutter curtain travels and the operation for the focus adjustment is performed, the optical image blur correction is turned off to prevent image deterioration due to the optical image blur correction.

In the first shake occurrence period, the images obtained with the first exposure period are aligned by the first alignment unit 13a, and synthesized by the synthesis unit 13, thereby performing the image blur correction. Since the first shake occurrence period accounts for a small proportion of the total shooting period, even if only blur correction by image alignment is performed without performing the optical image blur correction, the blur correction accuracy does not deteriorate significantly. In the second shake occurrence period after the first shake occurrence period ends, the optical image blur correction is started and the remnant of the optical image blur correction is corrected by the second alignment unit 13b.

Figure 9:
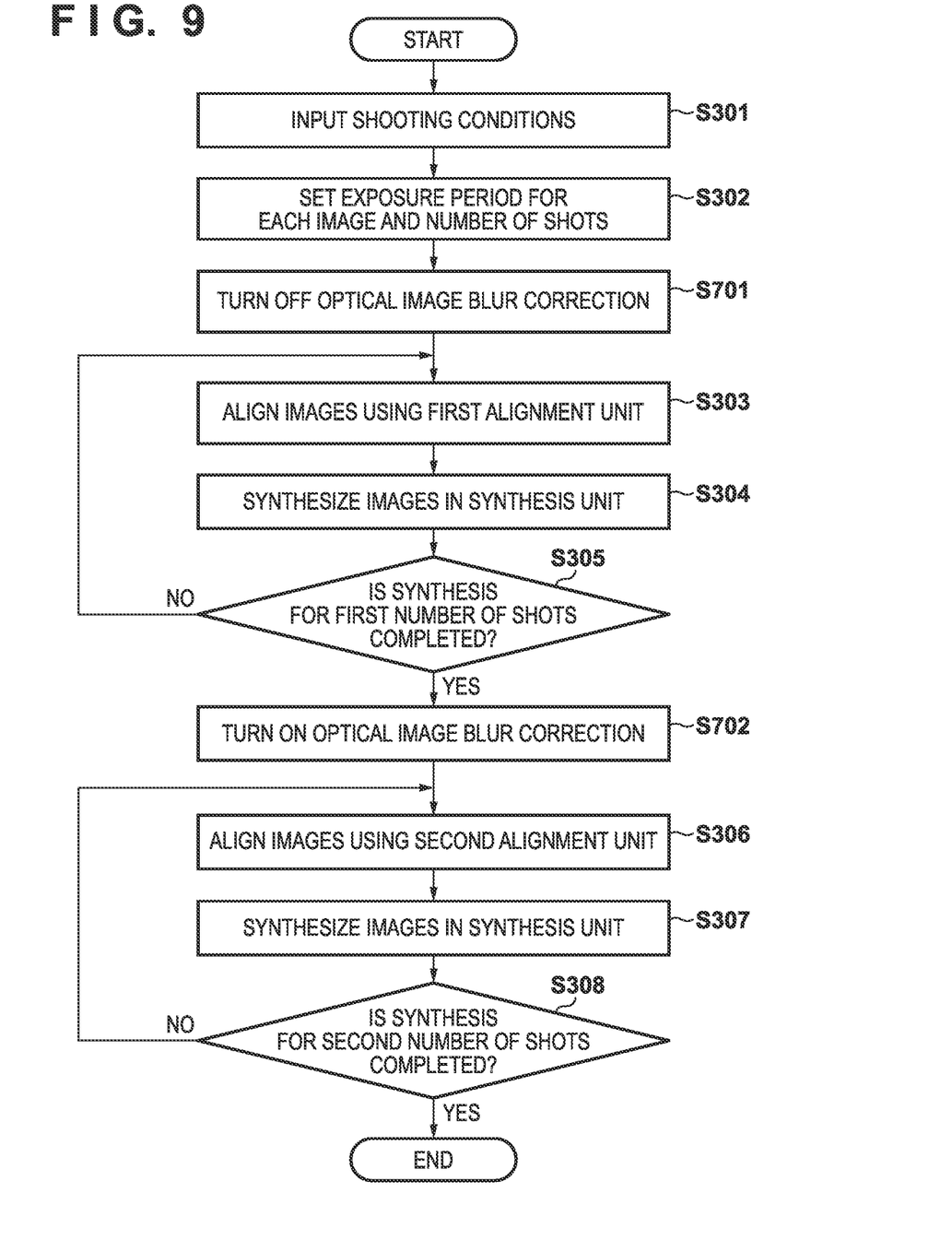
FIG. 9 is a flowchart showing image blur correction processing according to the fourth embodiment.

FIG. 9 is a flowchart for explaining the operation of the synthesis unit 13 and the control unit 14, and the difference from the flowchart of FIG. 5 is the point that steps S701 and S702 are added. Therefore, only these steps will be described. Further, it is assumed that the shooting conditions such as the first and second exposure periods are acquired in the same manner as in the second embodiment.

In step S701, the optical image blur correction is turned off so that image deterioration does not occur in each image shot during the first shake occurrence period.

In step S702, by turning on the optical image blur correction, image blur that occurs in the image during the second shake occurrence period caused by camera shake of the photographer is corrected.

In this way, each image is shot with the first exposure period with the optical image blur correction turned off to cope with the first vibration generated at the start of shooting, and images are quickly aligned using the first alignment unit 13a. Thereby, high frequency blur can be corrected. Then the optical image blur correction is turned on to cope with the subsequent second shake. In that state, each image is shot with the second exposure period, and the second alignment unit 13b is used to correct the blur with high accuracy.

Figure 10:
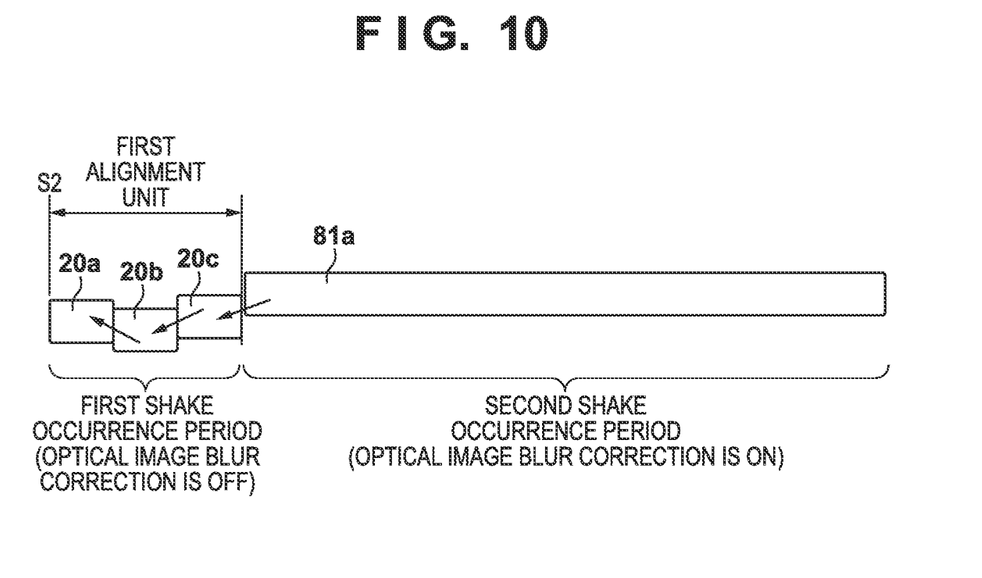
FIG. 10 is a diagram illustrating an example of modified operation according to the fourth embodiment.

If the accuracy of the optical image blur correction can be expected during the second shake occurrence period, it is not necessary to perform the image blur correction by aligning the images during the second shake occurrence period. That is, as shown in FIG. 10, each image is shot with the first exposure period with the optical image blur correction turned off to cope with the first shake generated at the start of shooting, and the first alignment unit 13a is used to align images quickly. This makes it possible to correct high-frequency blur. Then, to cope with the second vibration occurred thereafter, shooting is performed with the optical image blur correction turned on.

Fifth Embodiment

In the first embodiment, either the first alignment unit or the second alignment unit is selected to perform alignment according to at least either of the shooting conditions or the subject information. On the other hand, in the second to fourth embodiments, the alignment is performed by the first alignment unit 13a for a predetermined period (the period for shooting a predetermined number of images) from the start of shooting, and after the predetermined period elapses, the second alignment unit 13b is used to perform alignment. The first embodiment and the second to fourth embodiments can be combined.

For example, even if it is not determined in step S204 of the first embodiment that the conditions for using the first alignment unit are satisfied and the process proceeds to step S206, as in the second to fourth embodiments, alignment is performed by using the first alignment unit for a predetermined period from the start of shooting. This makes it possible to reduce the influence of high-frequency vibration generated by driving the mechanical units of the image capturing apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-158971, filed Sep. 23, 2020, which is hereby incorporated by reference herein in its entirety.

What is claimed is:

1. An image processing apparatus comprising at least one processor or circuit configured to function as:
   a first alignment unit that aligns a plurality of images that have been continuously shot;
   a second alignment unit that aligns the plurality of images with higher accuracy than the first alignment unit, a processing time taken to perform the alignment being longer than a processing time taken by the first alignment unit;
   a selection unit that selects an alignment unit from the first alignment unit and the second alignment unit to be used for aligning the plurality of images according to shooting conditions of the plurality of images; and
   a synthesis unit that synthesizes the plurality of images that have undergone alignment by the alignment unit selected by the selection unit,
   wherein the first alignment unit aligns the plurality of images by translating a first image, and
   wherein the first image includes a plurality of pixels, and each pixel of the plurality of pixels corresponds to each pixel of an imaging device for shooting the images and has color information of one color.

2. The image processing apparatus according to claim 1, wherein the first alignment unit aligns the plurality of images by translating the first image by a cycle of pixels.

3. The image processing apparatus according to claim 1, wherein the shooting conditions include at least one of an exposure period for each of the plurality of images, a number of images to be continuously shot, a shake of an image capturing apparatus, and an elapsed time from start of image shooting.

4. The image processing apparatus according to claim 3, wherein, in a case where the exposure period for each of the plurality of images is a predetermined period or shorter, the selection unit selects the first alignment unit as the alignment unit to be used for aligning the plurality of images.

5. The image processing apparatus according to claim 3, wherein, in a case where the number of images to be continuously shot is a predetermined number or more, the selection unit selects the first alignment unit as the alignment unit to be used for aligning the plurality of images.

6. The image processing apparatus according to claim 3 further comprising a shake detection sensor that detects a shake applied to the image capturing apparatus that shoots the plurality of images.

7. The image processing apparatus according to claim 6, wherein, in a case where a rotational shake amount over a period for shooting the plurality of images detected by the shake detection sensor is a predetermined amount or less, the selection unit selects the first alignment unit as the alignment unit to be used for aligning the plurality of images.

8. The image processing apparatus according to claim 3, wherein the at least one processor or circuit is configured to further function as a subject detection unit that detects a subject in the images.

9. The image processing apparatus according to claim 8, wherein, in a case where a size of the subject acquired by the subject detection unit is a predetermined size or less, the selection unit selects the first alignment unit as the alignment unit to be used for aligning the plurality of images.

10. The image processing apparatus according to claim 1, wherein the selection unit selects the first alignment unit or the second alignment unit in response to change in the shooting conditions.

11. The image processing apparatus according to claim 10, wherein the selection unit selects the first alignment unit during a first period, and selects the second alignment unit during a second period which is different from the first period.

12. The image processing apparatus according to claim 11, wherein the first period is a predetermined period from start of shooting and the second period is a period subsequent to the first period.

13. The image processing apparatus according to claim 11, wherein the at least one processor or circuit is configured to further function as a correction control unit that controls a correction device for correcting image blur based on output from a shake detection sensor, and
   wherein the correction control unit controls the synthesis unit to synthesize the plurality of images without driving the correction device during the first period, and with driving the correction device during the second period.

14. The image processing apparatus according to claim 11, wherein the second alignment unit aligns the plurality of images by converting the first image into a second image and applying geometric transformation including translation and rotation to the second image with sub-pixel accuracy and
   wherein the second image includes a plurality of pixels, and each pixel of the plurality of pixels corresponds to each pixel of an imaging device for shooting the images and has color information of a plurality of colors.

15. The image processing apparatus according to claim 1, wherein the at least one processor or circuit is configured to further function as a control unit that sets an exposure period for each of the images to be aligned by the first alignment unit based on a driving state of each element of an image capturing apparatus.

16. The image processing apparatus according to claim 1, wherein the at least one processor or circuit is configured to further function as a control unit that acquires a driving state of each element of an image capturing apparatus that shoots the plurality of images, and sets a number of shots of images to be aligned by the first alignment unit based on the driving state.

17. The image processing apparatus according to claim 1, wherein the synthesis unit selects whether to synthesize the plurality of images after aligning the images or to synthesize the plurality of images without aligning the images.

18. The image processing apparatus according to claim 17, wherein the synthesis unit further synthesizes an image obtained by synthesizing the images without aligning the images.

19. An image capturing apparatus comprising:
an image shooting device capable of continuously shooting a plurality of images; and
an image processing apparatus comprising at least one processor or circuit configured to function as:
a first alignment unit that aligns a plurality of images that have been continuously shot;
a second alignment unit that aligns the plurality of images with higher accuracy than the first alignment unit, a processing time taken to perform the alignment being longer than a processing time taken by the first alignment unit;
a selection unit that selects an alignment unit from the first alignment unit and the second alignment unit to be used for aligning the plurality of images according to shooting conditions of the plurality of images; and
a synthesis unit that synthesizes the plurality of images that have undergone alignment by the alignment unit selected by the selection unit,
wherein the first alignment unit aligns the plurality of images by translating a first image, and
wherein the first image includes a plurality of pixels, and each pixel of the plurality of pixels corresponds to each pixel of an imaging device for shooting the images and has color information of one color.

20. An image shooting control apparatus comprising at least one processor or circuit configured to function as:
a control unit that controls a correction device for correcting image blur based on output from a shake detection sensor;
an alignment unit that aligns a plurality of images shot by an image shooting device; and
a synthesis unit that synthesizes the plurality of images aligned by using the alignment unit,
wherein the control unit controls to perform image blur correction without driving the correction device in a first period and with driving the correction device in a second period, and
wherein the synthesis unit synthesizes a plurality of images shot in the first period and an image shot in the second period.

21. The image shooting control apparatus according to claim 20, wherein the first period is a predetermined period from start of shooting and the second period is a period subsequent to the first period.

22. A control method of an image processing apparatus comprising at least one processor or circuit configured to function as a first alignment unit that aligns a plurality of images that have been continuously shot and a second alignment unit that aligns the plurality of images with higher accuracy than the first alignment unit, a processing time taken to perform the alignment being longer than a processing time taken by the first alignment unit, wherein the first alignment unit aligns the plurality of images by translating a first image, and the first image includes a plurality of pixels, and each pixel of the plurality of pixels corresponds to each pixel of an imaging device for shooting the images and has color information of one color, the method comprising:
selecting an alignment unit from the first alignment unit and the second alignment unit to be used for aligning the plurality of images according to shooting conditions of the plurality of images; and
synthesizing the plurality of images that have undergone alignment by the alignment unit selected by the selection unit.

23. A control method of an image shooting control apparatus comprising:
controlling a correction device for correcting image blur based on output from a shake detection sensor;
aligning a plurality of images shot by an image shooting device; and
synthesizing the plurality of aligned images,
wherein image blur correction is controlled to be performed without driving the correction device in a first period and with driving the correction device in a second period, and
wherein a plurality of images shot in the first period and an image shot in the second period are synthesized upon synthesizing the plurality of aligned images.

24. A non-transitory computer-readable storage medium, the storage medium storing a program that is executable by the computer, wherein the program includes program code for causing the computer to perform a control method of an image processing apparatus comprising at least one processor or circuit configured to function as a first alignment unit that aligns a plurality of images that have been continuously shot and a second alignment unit that aligns the plurality of images with higher accuracy than the first alignment unit, a processing time taken to perform the alignment being longer than a processing time taken by the first alignment unit, the method comprising:
selecting an alignment unit from the first alignment unit and the second alignment unit to be used for aligning the plurality of images according to shooting conditions of the plurality of images; and
synthesizing the plurality of images that have undergone alignment by the alignment unit selected by the selection unit,
wherein the first alignment unit aligns the plurality of images by translating a first image, and
wherein the first image includes a plurality of pixels, and each pixel of the plurality of pixels corresponds to each pixel of an imaging device for shooting the images and has color information of one color.

25. A non-transitory computer-readable storage medium, the storage medium storing a program that is executable by the computer, wherein the program includes program code for causing the computer to perform a control method of an image shooting control apparatus comprising:
controlling a correction device for correcting image blur based on output from a shake detection sensor;
aligning a plurality of images shot by an image shooting device; and
synthesizing the plurality of aligned images,
wherein image blur correction is controlled to be performed without driving the correction device in a first period and with driving the correction device in a second period, and
wherein a plurality of images shot in the first period and an image shot in the second period are synthesized upon synthesizing the plurality of aligned images.

* * * * *